(12) United States Patent
Singer et al.

(10) Patent No.: US 6,679,085 B1
(45) Date of Patent: Jan. 20, 2004

(54) SHAPING TOOL WITH A STRUCTURED SURFACE FOR PRODUCING STRUCTURES ON GLASS, AND THE APPLICATION THEREOF FOR STRUCTURING CHANNEL PLATES

(75) Inventors: Rudolf Singer, Engelstadt (DE); Joachim Disam, Mainz (DE); Christiane Baum, Jena (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/720,844

(22) PCT Filed: Oct. 8, 1999

(86) PCT No.: PCT/EP99/07545

§ 371 (c)(1),
(2), (4) Date: Dec. 29, 2000

(87) PCT Pub. No.: WO00/21894

PCT Pub. Date: Apr. 20, 2000

(30) Foreign Application Priority Data

Oct. 15, 1998 (DE) .......................... 198 47 549

(51) Int. Cl.[7] .................. C03B 13/16; C03B 40/00
(52) U.S. Cl. ................... 65/162; 65/24; 65/29.19; 65/169; 65/255; 65/273; 65/356; 65/370.1; 65/374.11; 65/374.12; 65/374.13
(58) Field of Search ............... 65/24, 29.19, 94, 65/100, 101, 106, 162, 169, 245, 255, 256, 257, 258, 273, 356, 370.1, 374.11, 374.12, 374.13

(56) References Cited

U.S. PATENT DOCUMENTS 789,191 A * 5/1905 Wadsworth ............... 65/93
798,642 A * 9/1905 Wadsworth ............... 65/81
907,656 A * 12/1908 Wadsworth ............... 65/185
1,028,129 A * 6/1912 Neuhauser ............... 65/94
1,261,939 A * 4/1918 Johanson ............... 65/156
1,297,566 A * 3/1919 Johanson ............... 65/255
1,466,621 A * 8/1923 Hancock ............... 62/255
1,528,194 A * 3/1925 Burgess ............... 65/255
1,671,819 A * 5/1928 Evans ............... 165/89
3,238,031 A * 3/1966 Nikoll ............... 65/94
4,023,391 A * 5/1977 Kamii et al. ............... 72/200
5,853,446 A * 12/1998 Carre et al. ............... 65/17.3
5,987,923 A * 11/1999 Ostendarp et al. ............... 65/102

FOREIGN PATENT DOCUMENTS

DE    197 13 309 C    7/1998
DE    197 13 312 A    10/1998
EP    0 866 487 A    9/1998

* cited by examiner

Primary Examiner—Sean E Vincent
(74) Attorney, Agent, or Firm—Michael J. Striker

(57) ABSTRACT

While avoiding the disadvantages of the screen printing technique employed until now, the invention provides a shaping tool (1) with a structured surface for creating structures on glass (2) which, in an economical way, makes it possible to form high-precision microstructures by local heating of the region of glass to be structured. The shaping tool (1) has a rolling cylinder (3) including a metal hollow cylinder (7) and a shaping sheet (8) secured in a surface contact to it, as well as a continuous shaft (5) for continuously driving the rolling cylinder (3) via drivers (4) coupled to the hollow cylinder (7). Between the shaft (5) and the hollow cylinder (7), an electric heater (6) for targeted local heating of the glass during structuring is disposed in an electrically insulated fashion. The electric heater (6) is advantageously thermally insulated from the shaft (5) with a ceramic cylinder (14).

18 Claims, 3 Drawing Sheets

Figure 3:
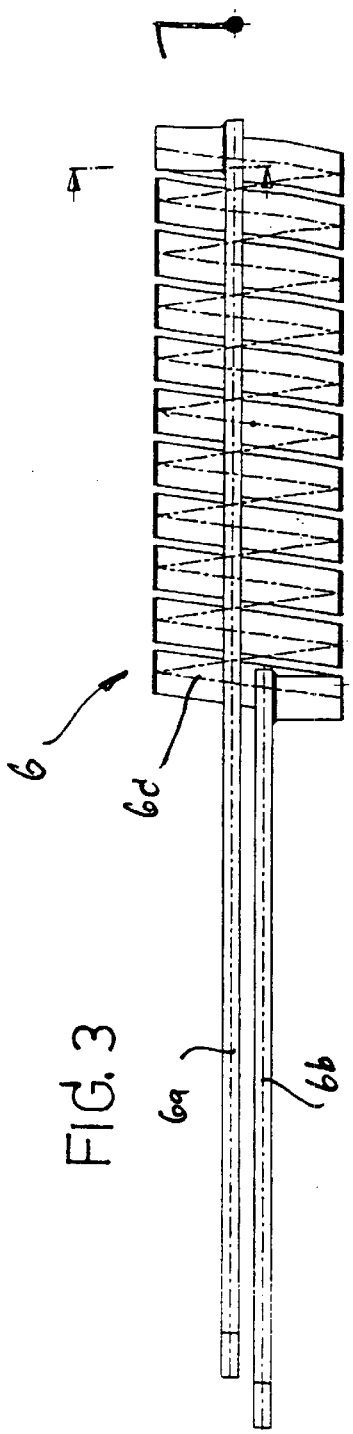

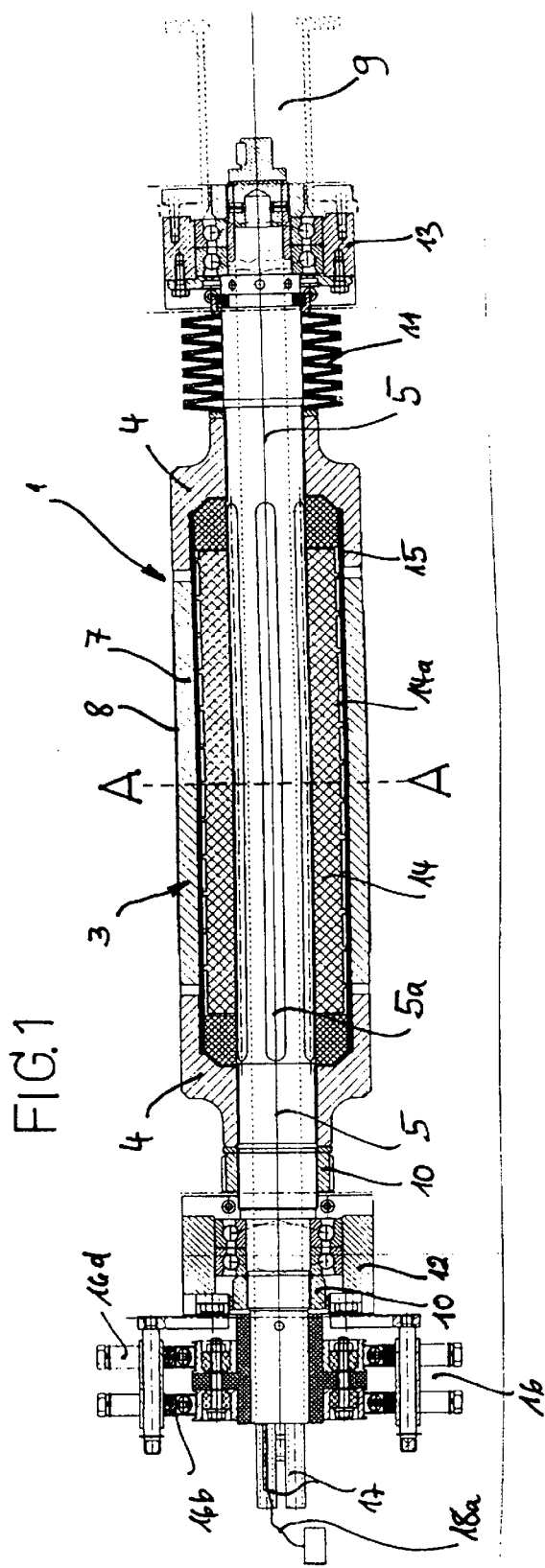
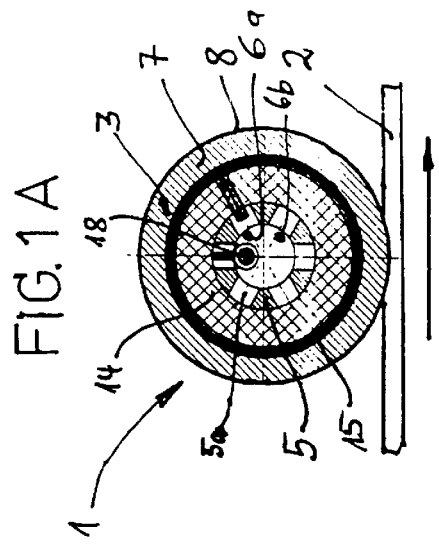
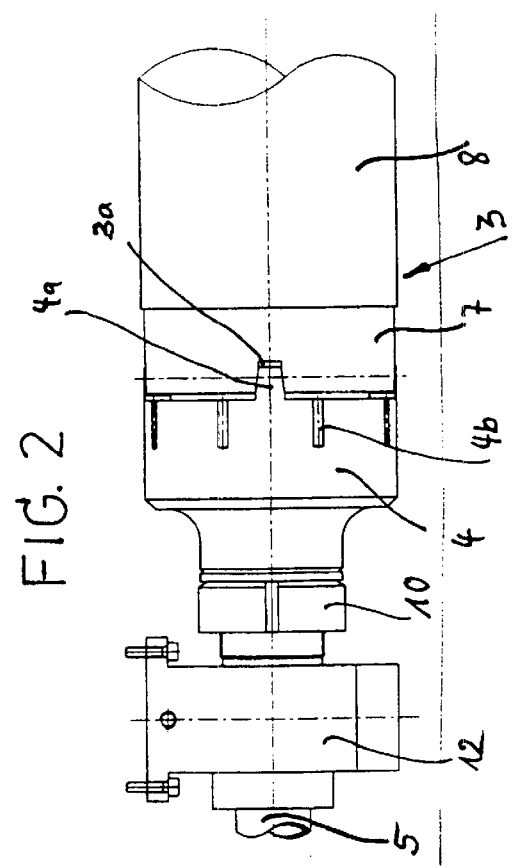

SHAPING TOOL WITH A STRUCTURED SURFACE FOR PRODUCING STRUCTURES ON GLASS, AND THE APPLICATION THEREOF FOR STRUCTURING CHANNEL PLATES

The invention relates to a shaping tool with a structured surface for creating structures on glass in the context of a hot-shaping method, which is employed in particular for making precision structures in a channel plate of flat screens.

Plate glass provided with precision structures is needed for precision applications, in particular in the field of glasses (that is, kinds of glass) that have optical functions. Such glasses are for instance display screens of new flat screen generations (PDPs or plasma display panels, and PALCs or plasma addressed liquid crystals). In the so- called channel plate of these flat screen glasses, microscopic channel structures for triggering individual rows or columns are made, which extend over the entire active width or height of the screen and in which plasma is ignited via an electrical discharge. The boundary on both sides of an individual channel is accomplished via rectangular ribs, whose width is as slight as possible. To achieve an adequate discharge volume, the height of the ribs is substantially greater than their width. The spacing of the ribs should be as slight as possible.

The channel plate thus represents the microstructured glass backpanel of a PALC or PDP display. It is shown in basic form and in detail on a greatly enlarged scale in FIG. 7.

The channel-like microstructuring shown in this drawing figure must be accomplished cost-effectively and in large numbers for different display sizes (diagonal screen sizes up to 55 inches). For a 42-inch HiVision PDP display, for instance, approximately 5760 channels with a pitch "X" of approximately 161 m$\mu$ and a rib height Y of 150 m$\mu$ and a rib width "Z" of 30 to 50 m$\mu$, with tolerances of only a few micrometers over a length of about 520 mm must be made. These enormously stringent specifications dictate a high-precision method and a corresponding apparatus.

It is known to create structures on glass on the basis of a shaping tool with a structured surface, using hot- shaping techniques.

Conventional hot-shaping methods, so-called creative forming methods, are conceived such that hot (molten) glass is given its desired form out of the melt by means of a cooled shaping tool that is pressed into the molten glass. The shaping tool takes on the function of "solidification shaping"; that is, before contact with the tool, the glass has a temperature above the glass transition range ($T_g$) and is cooled by the contact with the shaping tool in such a way that the negative of the structured surface of the shaping tool is copied dimensionally stably in the glass.

The invention takes as point of departure another hot-shaping method, which can be characterized as a reshaping warm-shaping process. In this reshaping shaping process, the temperature of the glass before it contacts the shaping tool having the structured surface is optionally below the glass transition range, and is raised to the requisite temperature range for shaping (T>$T_g$) only by contact with the shaping tool. It is decisive here that only local heating of whatever region is to be structured occurs. In this reshaping process as well, the glass when it leaves the shaping tool is in its structured form and in a dimensionally stable state.

Physical variables, which pertain to both the conventional hot-shaping method and the reshaping warm-shaping method in terms of the process sequence are:
- the temperature of the glass and of the shaping tool;
- the pressure load on the glass and the shaping tool;
- the time of contact of the glass and shaping tool (dwell time).

The following description of the dwell time may make this clearer:

If the glass comes into contact with the shaping tool only briefly, or in other words if the shaping tool is removed from the glass before the solidification occurs, then because of the flowing of the glass structure, major rounding occurs in the structure after contact.

If contact is long-lasting, then major temperature differences and different thermal expansions of the shaping tool and glass result in intolerable lateral strains, which adversely affect the precision of the structures, or in other words the precision with which the channels in channel plates can be positioned and reproduced.

A shaping tool which is intended to be appropriate for precise process control must assure an independent setting/regulation of the above-described variables. The known hot-shaping tools do not meet these requirements. Because of their conventional solid structure with chromium nickel steels, which necessitates heating the entire shaping tool completely, they furthermore have inadequate thermal dimensional stability, because at even relatively slight temperature fluctuations in the shaping tool, relatively major changes in length of the shaping structures occurs, changes that exceed the allowable tolerances for forming the channels or ribs.

The same applies to the shaping tool, disclosed by German Patent DE 197 13 309 C1 and German Patent Application DE 197 13 312 A1, with a structured surface for creating structures on glass on the principle of reshaping warm- shaping, which in the exemplary embodiment has a rolling cylinder, comprising a solid cylinder of preferably nonmetal material, to which a molding tool with the structure-imparting surface is clamped, resting relatively loosely. On each of the two face ends of the solid cylinder, a respective bearing journal for the rotational mounting of the rolling cylinder is provided. An external heating source is provided for the requisite local heating of the shaping tool.

Such an embodiment of the shaping tool does not make it possible in practice to create precision structures with the desired replicable precision, since the necessary thermal dimensional stability has not been adequately taken into account in the design of the individual components and in the bearing of the rolling cylinder. The enormously stringent specifications described at the outset can accordingly not be met.

With the shaping tool disclosed by European Patent Disclosure EP 0 866 487 A1 as well, the enormously stringent specifications discussed at the outset cannot be met.

This known shaping tool has a solid rolling cylinder comprising a metal alloy, and the shaping structures are formed directly on its circumferential surface. Nothing is said in the European Patent reference about the rotational support of the rolling cylinder. The glass substrate is plasticized by means of an external heat source before the rolling cylinder, which is not itself heated directly, in conjunction with a counterpart roller impresses the desired structure into the glass substrate.

This European reference again makes no statement as to the requirement for fine-tuning of the coefficients of thermal expansion and the bearing of the rolling cylinder in order to achieve the requisite thermal dimensional stability. In particular because of the solid rolling cylinder, even at slight temperature fluctuations, relatively major changes in length in the shaping structures occur, which exceed the allowable tolerances for forming the channels or ribs.

Producing channel plates by means of shaping tools with structured surfaces has therefore not gained a foothold in the industry.

The production of channel plates is therefore currently done in general by screen printing, in which between 10 and 20 layers of glass solder are deposited, one layer at a time, onto the glass substrate.

This method has the following disadvantages:
long process times
high solder costs
uneven sintering of the channel plates
environmental pollution (lead in the solder, etching solutions)

and therefore from a commercial standpoint allows the production only of prototypes; that is, it is not suited to commercial mass production.

It is the object of the invention to create a shaping tool with a structured surface for creating structures on glass that economically makes it possible to form high-precision microstructures in the glass by local heating of the region of glass to be structured, on the principle of reshaping warm-shaping.

This object is successfully attained by the invention by means of a shaping tool of this kind, having:

- a rolling cylinder, comprising a metal hollow cylinder, on whose outer jacket a metal shaping sheet, which is provided with recesses corresponding to the negative of the glass structures to be made, is put into intimate large-area contact;
- a shaft, for continuously driving the rolling cylinder, that extends through the metal hollow cylinder;
- two drivers, which are fixedly mounted on the shaft at the level of the face ends of the metal hollow cylinder and are in positive operative engagement with the hollow cylinder; and
- an electric heater, which is disposed in electrically insulated fashion between the shaft and the metal hollow cylinder, with an additional thermal insulation from the shaft.

Because of the manner in which the hot-shaping tool of the invention is constructed, it is economically possible, by simply rolling along the glass substrate, to form high-precision microstructures on the glass upon contact with the glass, by means of targeted local heating of the glass to be structured.

For attaining a constant reshaping temperature, the metal hollow cylinder plays a decisive role; by its thermal capacity, it prevents overly fast cooling upon contact with the glass. This effect is reinforced, in accordance with a feature of the invention, if the material comprising the metal hollow cylinder is a nickel wrought alloy.

In a further feature of the invention, the transmission of torque between the shaft and the rolling cylinder is established by providing that the drivers have at least three symmetrically distributed trapezoidal claws, and complementary trapezoidal recesses, which are in mutual operative engagement with the claws by small contact faces, are embodied on the face end of the metal hollow cylinder. This embodiment prevents an excessive outflow of heat from the rolling cylinder into the shaft. The construction is then free of play at temperature fluctuations within the component and at temperature differences from the rolling cylinder to the driver. As a result, the accuracy of concentricity is assured, or is always the same.

For production engineering reasons, expediently four claws offset by 90° are provided, but in principle any arbitrary number of claws greater than three is possible. The more claws there are, the more the connection corresponds to toothed gearing.

For the features of the invention, and in particular the disposition of the heater, are defined by the dependent claims.

Further characteristics and advantages of the invention will also become apparent from the description of exemplary embodiments of the invention shown in the drawings.

Figure 4:
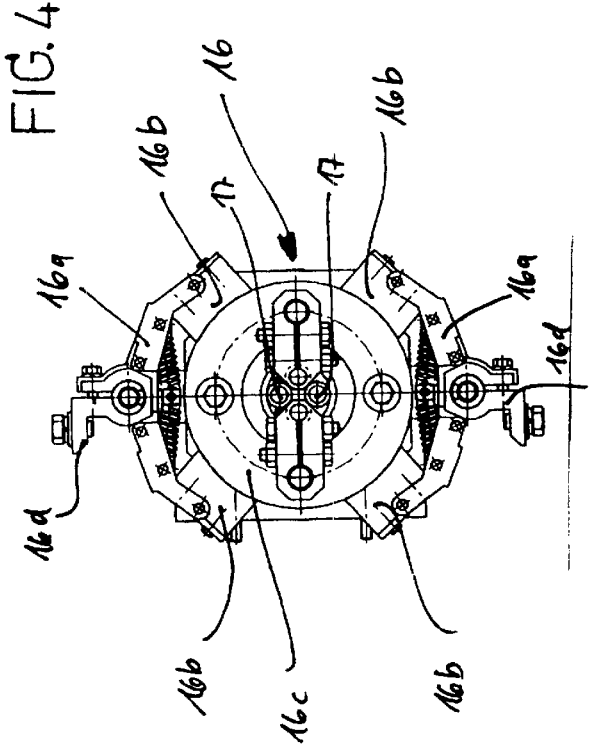
Figure 5:
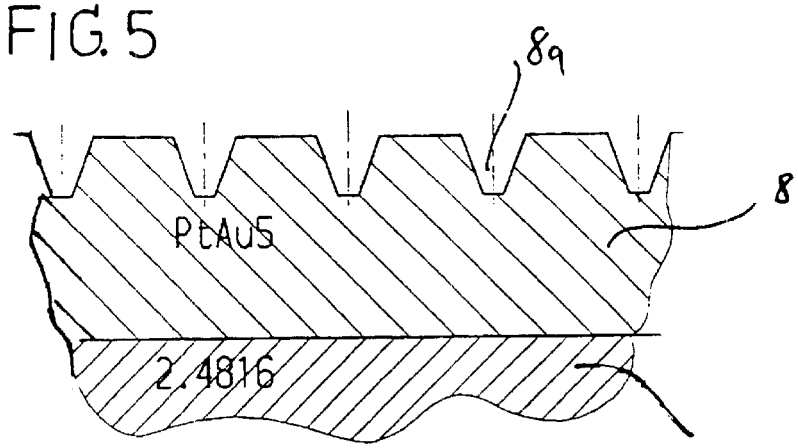
Figure 6:
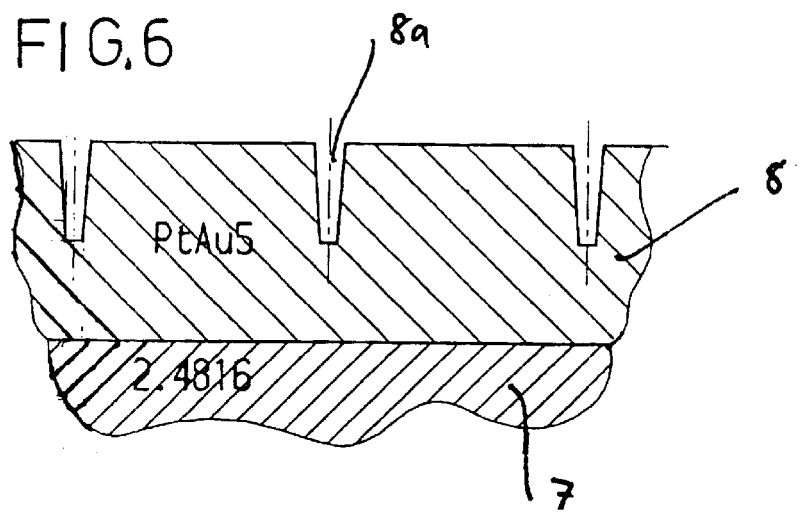
Figure 7:
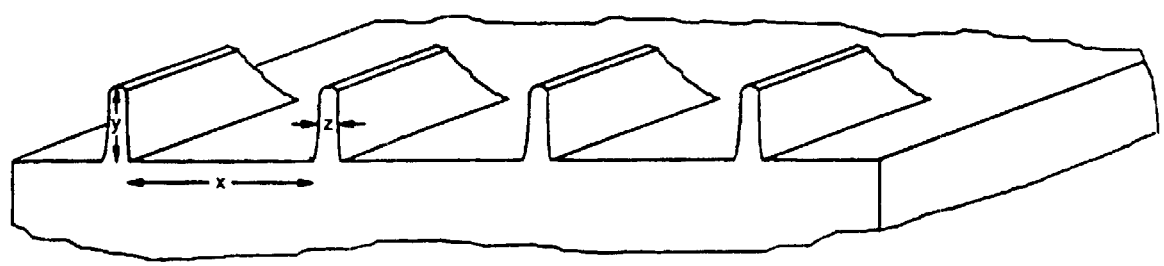

Shown are:

FIG. 1, in a longitudinal section, the construction of the hot-shaping roller according to the invention with a structure-bound rolling cylinder, driver, shaft and heater;

FIG. 1A, a sectional view through the roller of FIG. 1 taken along the line A—A;

FIG. 2, an enlarged detail of the roller of FIG. 1, in a plan view of the coupling of the shaft to the rolling cylinder via the drivers;

FIG. 3, a view of the heater, which is disposed between the shaft and the rolling cylinder of the shaping tool of FIG. 1 and serves to heat the rolling cylinder;

FIG. 4, an end-on front plan view on the shaping tool of FIG. 1, showing the slip ring contacts for supplying energy to the heater of FIG. 3;

FIG. 5, a greatly enlarged detail of the structure-imparting $PtAu5$ plate which surrounds the roller, for a PDP structure;

FIG. 6, a view corresponding to FIG. 5, but for a PALC structure instead;

FIG. 7, a detail showing a structured channel plate of known channel structure.

In FIG. 1, in a longitudinal section, the basic construction of a preferred embodiment of the hot-shaping tool of the invention is shown. The shaping tool has the shape of a roller generally identified by reference numeral 1, which is rolled continuously at a high contact pressure over a glass substrate 2 (FIG. 1A) to be structured, in that the glass substrate 2 is pulled through in the direction of the arrow under the shaping roller 1.

Special demands must be made of the glass substrate.

The production of channel plates for display systems, to which the invention preferably pertains, generally requires high-quality, specially-developed glass substrates 2, which are distinguished by robust process performance in all the production steps involved. Along with the extreme smoothness of the glass substrates, which is responsible in the final analysis for contrast sharpness and image resolution quality, temperature resistance, chemical resistance, low weight, and an adapted thermal expansion behavior are required.

The demands made of the ideal glass substrate for modern display technologies can be expressed in general and in terms of trends as being flatter, thinner and smoother, and at the same time having the most inert possible and sturdiest possible behavior in the complicated method steps, which are of quite different types depending on the type of display, and also being available at a favorable price (in large dimensions).

Boron silicate glasses play an outstanding role in many technically oriented glass applications. Because there is an inexhaustible number of possible chemical composition variations, extraordinary properties are attainable for this glass family. These glasses are especially distinguished by high temperature resistance, low thermal expansion, and good chemical resistance to aggressive media. Furthermore, such glasses can be produced even without adding alkaline components. These special properties afford access to new and technologically quite promising modern plate-glass applications.

From the above-described operative principle of flat screens, the following guideline demands of a glass substrate for a channel plate can be derived:

high temperature resistance ($Tg \geq 600°$ C.)
low density ($<2.8$ g/cm$^3$)
excellent surface quality (planarity, warp, waviness, etc.)
low shrinkage ($\leq 20$ ppm)
no "thermal sag"

optimal adaptation of the thermal expansion high electrical resistance low gas permeability high transmission adequate mechanical strength large dimensions cost-effective Along with the Corning overflow fusion method and the down-draw technology, float technology above all allows the cost-effective manufacture of large-size glass substrates with excellent surface qualities and with properties adapted to the production process for the display in question.

The embodiment of the shaping tool 1 is determined by the specific demands listed at the outset.

These involve essentially furnishing the following:

a structured shaping tool for creating the glass structure;

a shaping tool resistant to bending, for absorbing the rolling forces;

a shaping tool for continuous production (which is attained by means of the roller structure); and a regulatable hot tool.

These conditions are met by the shaping roller 1 shown in the drawing, which is constructed of four central components. These four central components are: a rolling cylinder 3, two drivers 4, a shaft 5, and a heater 6, which for the sake of clarity is shown separately in FIG. 3.

The rolling cylinder 3 forms the shaping part of the tool, because it carries on it the negative of the structure to be created. The rolling cylinder first comprises a load-bearing metal hollow cylinder 7, for instance with a length of 300 mm, an outer diameter of 120 mm, and a wall thickness of 12 mm.

The material comprising the rolling cylinder is preferably a nickel wrought alloy with the material No. 2.4816. The advantage of a metal alloy over a ceramic material is the high coefficient of thermal expansion of metals, which compared with ceramics is only slightly different from glass coefficients. The following table shows examples of differential expansion coefficients of various materials that can be used:

| Material Category | Material | Differential Coefficient of Expansion at 800° C. | Difference in Differential Coefficient of Expansion from the Glass Coefficient |
|---|---|---|---|
| Glass | AF45 | $\alpha_{800°\ C.} = 37\ 10^{-6}/K$ | |
| Ceramic | Quarzal | $\alpha_{800°\ C.} = 0.5\ 10^{-6}/K$ | $\Delta\alpha_{800°\ C.} = 36.5\ 10^{-6}/K$ |
| Metal | Inconel | $\alpha_{800°\ C.} = 20\ 10^{-6}/K$ | $\Delta\alpha_{800°\ C.} = 17\ 10^{-6}/K$ |

If temperature fluctuations occur during the rolling, the dimensional deviation of the product is less, because of the small difference in the coefficients of expansion of the metal roller and glass, than if a ceramic roller is used.

The calculation below is intended to illustrate the subject matter more clearly.

The tolerance in a structure in the glass, over a substrate length of 100 mm, should amount for instance to no more than ±10 μm. Within the allowable amount of temperature fluctuations, the advantage of a metal roller over a ceramic roller is quite apparent. For the metal tool, a temperature difference of ±4.8 kelvins (K) is still possible, while a ceramic tool allows a temperature fluctuation of only ±2.8K. Dimensional deviations resulting from an uneven temperature distribution in the tool can be eliminated by means of a corrective tool contour design (such as a convex or concave form of the jacket face).

A metal sheet 8 with a thickness of 1 mm, for example, into which the negative of the glass structure required has been machine, is applied over the entire circumference to the outer surface of the metal hollow cylinder 7. For reasons of scale, these negative contours cannot be shown in FIG. 1. They can be inferred from the greatly enlarged detail views in FIGS. 5 and 6, specifically for a PDP channel structure in FIG. 5 and for a PALC structure in FIG. 6. The recesses in the sheet 8 are therefore complementary to the ribs in the channel plate of FIG. 7.

One important aspect in terms of process suitability and economy is the material used for the sheet 8.

Tools that are used in the field of hot shaping of glass in fact make extremely stringent demands of the tool material to be employed. In selecting the material, the following criteria must therefore be taken into account:

no tendency to adhere to the glass no corrosion or oxidization high thermal strength (durability)

low wear cost-effectiveness.

For the rolling tool of FIG. 1, which is intended to use in microstructuring glass, the following additional demands must be met:

microstructurability heatability (good thermal conduction)

Scientific material testing and long years of experience in the manufacture of shaping tools for hollow glass shaping have shown that platinum or platinum alloys, such as PtAu5 alloys, with a pure PtAu5 material or alternatively with an oxide-dispersed PtAu5 material (ODS), best meet the demands made in terms of little tendency to adhere to glass and little corrosion or oxidization.

However, these materials have low thermal resistance, are not optimally wear-resistant, and are moreover very expensive. The low thermal resistance, which causes a loss of structure accuracy in the rolling tool, is disadvantageously expressed accordingly in the glass structure as well.

The material wear resulting from the low hardness of the PtAu5 material does on the other hand offer the important advantage of allowing mechanical, metal-cutting machining of the structuring. The requirement for high abrasion resistance makes for corresponding difficulties in microstructuring, yet is the essential prerequisite to the use of the roller. It is up to one skilled in the art to find the optimal compromise for a specific application.

Instead of the PtAu5 alloy, it is also conceivable to use materials employed in the glass industry that are coated, in order to reduce their tendency to adhere or to increase their wear resistance, as the tool material.

The following material combinations are conceivable:

| Bulk Materials: | Coating materials: |
|---|---|
| Inconel | SiC |
| Nicrofer | BC/N |
| Nimonic | TiC/N |
| Udimet | TiAlN |
| Incoloy | $MoS_2$ |
| PM 2000 | Pt, Au alloys |
| | Ni—P |
| | Hard gold |

The goal in each case is a combination of materials that leads to a wear-resistant, microstructurable, heat-conducting material with an only slight (or no) tendency to adhere to the glass.

To improve the compatibility of the tool and glass and to improve the wear resistance of the surface, the metal sheet must be bonded very intimately with the fundamental metal hollow cylinder 7.

In a particular embodiment, the sheet 8 is hot-isostatically pressed on (hipped). This is a large-area diffusion welding process that involves a complete fusion of material.

Instead of the hot-isostatic pressing, in principle any method for surface refinement can be employed; and the corresponding metal, ceramic or refined coatings can be applied either before the structuring using the negative structure, or after.

The embodiment of the structures in the sheet 8 has a definitive influence on the quality of the glass structures to be made, because to make the microstructures in the glass, the glass must be made to flow into the rolling grooves 8a (FIGS. 5 and 6). The nature of the microstructure (grooves extending all the way around the tool) has a major influence on the possibilities for mechanically anchoring the glass composition during the shaping. For this reason, extremely smooth channel flanks without undercuts are of enormous importance, if the hot-shaping process is to be successful. Another requirement is minimal roughness of the tool surface, since in the rolling operation the tool structure and any peaks and valleys or defects in it will be copied exactly in the deformed glass.

In summary, the following demands are made of the structured rolling tool:

exact geometric copying of the negative of the glass structure required high smoothness and low roughness of the channel flanks and of the surface adherence to a requisite unmolding angle.

The microstructuring of the roller body 1 is dependent essentially on the machinability of the material comprising the metal sheet 8. In general, the following methods are conceivable:

laser machining
wire erosion
grinding
turning on a lathe
embossing
milling
etching
hobbing erosion Each method makes different demands of the material to be structured.

In the industry, the following methods are especially worth considering:

laser machining
erosion
grinding
precision turning on a lathe;

precision turning by means of a monocrystalline natural diamond is especially important for microstructuring, as tests have shown.

For turning the hollow rolling cylinder 3, the aforementioned drivers 4, which are fixedly disposed on the shaft 5, are provided.

The drivers 4 therefore serve to transmit torque between the shaft 5 and the rolling cylinder 3. The connection of the drivers with the rolling cylinder is formed by four trapezoidal claws 4a (FIG. 2) each that are in operative engagement, with play, with four trapezoidal grooves 3a formed, extending radially, on both ends of the rolling cylinder 3. This number is solely an example. There may also be three, six or eight pairs of claws in symmetrical distribution, or any other number greater than three.

This claw drive with clearance on the one hand, by its geometrical shape, enables axial and radial thermal expansions, or in other words different thermal expansions between the cylinder and the driver, and on the other, because only small surface areas contact another, allows only slight heat losses from the rolling cylinder to the drivers.

This drive construction makes it possible, to great advantage for the accuracy of the microstructures, to achieve a defined position of the rolling cylinder despite the considerable thermal expansions.

To minimize coupling (the input of inductive power) with the attendant power loss, the drivers 4 are provided with axial slits 4b (FIG. 2) on the side toward the rolling cylinder.

The metal material used for the drivers 4 is preferably the same as for the rolling cylinder (material No. 2.4816), which has sufficient strength at the high operating temperatures.

The shaft 5 connects a drive mechanism 9, indicated symbolically on the face end, with the drivers 4 and carries both the heater 6 and its hookups 6a, 6b. It is supported in locating-nonlocating bearings 12, 13 with prestressed precision spindle bearings, which allow freedom of axial and radial play. The torque between the shaft 5 and the drivers 4 is transmitted via a frictional engagement (bracing of the components). To protect against corrosion and wear, an $Al_2O_3$ coating is applied in the contact region of these components.

The drivers and the shaft 5 are axially braced against one another by means of shaft nuts 10 and cup springs 11 and therefore, because of their disposition, allow different thermal expansions between the drivers/rolling cylinder and the shaft. The shaft 5 in this arrangement takes on the function of a tie rod, which leads to increased rigidity of the rolling cylinder 3.

To make it possible to dispose the current supply leads—to be described hereinafter—for the heater, the conduits for the air cooling and the hookups for the thermocouple (temperature measurement), the shaft 5 is embodied as a hollow shaft. To keep the power losses in the shaft during electric heating slight, the shaft is made with six longitudinal slits 5a (FIG. 1A) distributed uniformly over the circumference; this prevents induction current losses from developing in the shaft.

The shaft 5 preferably comprises the highly heat-resistant material No. 2.4879.

The heater 6 is disposed in the region between the rolling cylinder 3 and the shaft 5. Acting as the hot conductor is a PtRh10 strip 6c (20 by 1.5 mm), which is wound in grooves 14a of a ceramic cylinder 14 into a coil as shown in FIG. 3.

This ceramic cylinder 14 insulates the shaft 5 both electrically and thermally from the hot conductor 6c. Quarzal can be used in particular as the material for the ceramic cylinder.

The rolling cylinder 3 is electrically insulated from the hot conductor 6c by an approximately 2 mm thick quartz glass tube 15. The slight spacing assures fast, low-loss heat transmission, and the transmission properties of the quartz glass assure a good exchange of radiation.

Because of the aforementioned geometric construction, both indirect heating (resistance heating) and direct heating (inductive heating) of the rolling cylinder are possible. The heat required for the manufacturing process can be varied in a known manner by regulating the voltage potential or the current intensity.

Instead of the hot conductor strip 6c, other geometries may be employed, in particular wire, rod or tube profiles. Still other hot conductor materials, in particular kanthal or nicrothal alloys or noble metal alloys, can also be used as the material, depending on the thermal stress.

The supply of energy to the heater is accomplished by means of a slip ring contact assembly 16 on one shaft end, and rod elements 6a, 6b (FIG. 3) in the (hollow) shaft 5.

FIG. 4 in plan view shows further details of the slip ring contact assembly 16. It fundamentally comprises four double-leg carbon holders 16a with silver graphite carbon 16b, which each slip in pairs on a respective cylinder portion 16c, to which a respective end of the current lead 6a, 6b (FIG. 3) is extended. Clamps 16d serve to hook up the supply lines.

To prevent overheating of the shaft 5, two ceramic tubes 17 are installed in the interior of the shaft, and by means of these tubes, cool air is blown into the center of the shaft; this air can exit again on both ends. A thermocouple 18 (FIG. 1A) in the middle of the coil, with a terminal 18a (FIG. 1) extended to the outside, makes it possible to monitor the temperature and regulate the heater.

This heater can be operated with air cooling as an ohmic resistance heater (50 Hz). As the type of heating, medium-frequency induction heating is optionally usable, which uses either copper (water-cooled) or noble metal (without cooling) as its electrical conductor.

The heater is an essential component of the shaping roller according to the invention, because the shaping process by reshaping, which is the point of departure for the invention, requires a targeted reheating of the glass substrate. This reheating is effected by purposefully heating the rolling cylinder 3 to a temperature that is higher than Tg, that is, the glass transition temperature of the glass to be structured. To create fine structures close to the shaping tool on only the surface of the substrate, accurate temperature control is necessary, in which the least toughness of the glass occurs in the boundary layer between the shaping tool and the glass. This requires a higher tool temperature in comparison to the glass temperature of the typically preheated glass substrate.

On the other hand, by means of the hot tool a temperature gradient is built up in the substrate, which leads to thermal stresses. The necessity of minimizing these stresses, in order to avoid breakage, determines the lower limit of the outset temperature of the glass before the shaping. In the depressurization range, it is above the Tg point (at a toughness of about 10 E+12 dPa s). In order then to influence the fundamental structure of the starting material as little as possible, the outset temperature of the glass should be kept as low as possible.

For the shaping, the temperature of the thin surface layer of the glass that is involved, by material transport, in the reshaping process is crucial. This shaping temperature is equivalent to a mixture of the temperatures of the tool and the glass before contact. Other essential influences are exerted by the properties of the components, such as thermal conductivity and thermal capacity. Since heat is flowing from the hot tool into the colder workpiece during the entire shaping time, a constant supply of heat to the tool at the contact point must be assured, so as to maintain the flow of material into the grooves. In the present case, this is done by means of heating the interior of the roller, which because of the solid metal hollow cylinder 7 has a high thermal capac-ity. A high tool temperature and hence a high boundary face temperature does speed up the shaping process, but also speeds up the heating throughout the specimen, which is of limited thickness and thereby loses so much stability that it is no longer possible to separate the intimately formed-on tool from the specimen without destroying the specimen. The destabilization if the temperature is raised and/or the shaping time is shortened can be ascribed to the severely bent toughness/temperature curve.

The requisite shaping time for forming a desired structure, particularly ribs whose height is greater than their width, is determined by flow events into a gap. The limiting factors are as follows:

| | |
|---|---|
| pressure: | linear |
| toughness: | linear |
| height: | quadratic |
| width: | quadratic |

Suitable deformation times in the rolling process, for a roller 120 mm in diameter (shaping engagement width approximately 3 mm) are on the order of 1.5 seconds (rolling speed: 2 mm/sec).

The shaping forces are generated by pressing the shaping roller 1 against the softening (viscous) glass. They thus occur in the form of internal pressure in a liquid, and not as stresses, as long as the shaping speeds remain low enough. The pressure that triggers the flowing of the glass into the gaps 8a of the tool is thus determined as force/contact area of the roller on the glass 2. This area is dependent on the roller diameter and on the depth to which the roller is lowered, and thus also on the shaping temperature.

The shaping roller according to the invention, by its construction, enables a suitable kind of process control, which in a way that was previously impossible leads to precise microstructuring by precise adherence to the aforementioned reshaping parameters.

We claim:

1. A shaping tool (1) with a structured surface for creating structures in glass (2), said shaping tool comprising a rolling cylinder (3) comprising a metal shaping sheet (8) and a metal hollow cylinder (7), said metal hollow cylinder having end faces on opposite ends thereof and an outer surface extending between said end faces, and wherein said metal shaping sheet (8) is provided with structuring recesses (8a) corresponding to said structures in said glass and is in an intimate large-area contact with said outer surface of said metal hollow cylinder;

a shaft (5) for continuously driving the rolling cylinder (3), said shaft extending through the metal hollow cylinder (7);

two drivers (4) fixedly mounted on the shaft (5) at the end faces of the metal hollow cylinder (7) and in positive operative engagement with the metal hollow cylinder (7); and an electric heater (6) for local heating of said glass, which is arranged in electrically insulated fashion between the shaft (5) and the metal hollow cylinder (6), with additional thermal insulation of the electric heater from the shaft.

2. The shaping tool as defined in claim 1, wherein the metal hollow cylinder (7) comprises nickel wrought alloy.

3. The shaping tool as defined in claim 1, wherein the shaping sheet (8) comprises a wear-resistant, microstructurable, heat-conducting material that does not adhere to said glass.

4. The shaping tool as defined in claim 3, wherein said shaping sheet (8) comprises at least one member selected from the group consisting of PtAu5 alloy, a pure PtAu5 material and an oxide-dispersed PtAu5 material.

5. The shaping tool as defined in claim 3, wherein said shaping sheet (8) comprises a foundation material with a coating applied thereon.

6. The shaping tool as defined in claim 1, made by large-area diffusion welding of said shaping sheet (8) to the metal hollow cylinder (7).

7. The shaping tool as defined in claim 1, wherein said structuring recesses (8a) in the shaping sheet (8) are formed with a diamond tool by precision turning with the diamond tool.

8. The shaping tool as defined in claim 1, wherein each of said drivers (4) have at least three symmetrically distributed trapezoidal claws (4a), said rolling cylinder (3) is provided with trapezoidal grooves (3a) on opposite ends of the rolling cylinder (3) and said trapezoidal grooves (3a) are complimentary to said trapezoidal claws (4a) so that said trapezoidal claws (4a) are in mutual operative engagement with the trapezoidal grooves (3a).

9. The shaping tool as defined in claim 8, wherein said drivers (4) have axial slits (4b) on respective ends of said drivers closest to the rolling cylinder (3) in order to minimize electrical coupling.

10. The shaping tool as defined in claim 1, wherein said shaft (5) is a hollow shaft, and further comprising locating-non-locating bearings (12, 13) with pre-stressed spindle bearings, said shaft (5) being mounted in said locating-non-locating bearings (12, 13).

11. The shaping tool as defined in claim 1, wherein said drivers (4) and said shaft (5) are braced together axially like a tie rod arrangement by a shaft nut (10) and a cup spring (11).

12. The shaping tool as defined in claim 10, wherein said shaft (5) has a plurality of longitudinal slits (5a) distributed uniformly over a circumference of said shaft (5).

13. The shaping tool as defined in claim 1, further comprising a ceramic cylinder (14) slipped onto said shaft (5) to thermally insulate said shaft (5), said ceramic cylinder being secured on said shaft (5) against relative rotation about said shaft, and said electric heater (6) comprising an electrically heatable conductor (6c) for generating heat, said conductor is received on an outer surface of said ceramic cylinder, and further comprising a quartz glass tube (15) for electrical insulation of the conductor (6c) from the metallic hollow cylinder (3), said quartz glass tube (15) being slipped over said ceramic cylinder (14) with said conductor (6c) arranged thereon.

14. The shaping tool as defined in claim 13, wherein said conductor (6c) of said electric heater (6) is a PtRh10 strip and said ceramic cylinder (14) is provided with conductor grooves (14a) into which said conductor (6c) is arranged or wound.

15. The shaping tool as defined in claim 1, further comprising a slip ring assembly (16) on the shaft (5), and wherein said slip ring assembly comprises means for supplying electrical energy to the electric heater (6).

16. The shaping tool as defined in claim 1, wherein said shaft (5) is a hollow shaft, and further comprising at least one ceramic tube (17) arranged in said hollow shaft for supplying cooling air to an interior of the hollow shaft.

17. The shaping tool as defined in claim 1, wherein said shaft (5) is a hollow shaft, and further comprising a thermocouple (18) installed in an interior of the hollow shaft.

18. A method for making precision structures in a channel plate for a flat screen, said method comprising the steps of:
   a) providing a shaping tool said shaping tool comprising a rolling cylinder (3) comprising a metal shaping sheet (8) and a metal hollow cylinder (7), said metal hollow cylinder having end faces on opposite ends thereof and an outer surface extending between said end faces and said metal shaping sheet (8) being provided with structuring recesses (8a) according to said structures to be produced in said glass and being in an intimate large-area contact with said outer surface of said metal hollow cylinder, a shaft (5) for continuously driving the rolling cylinder (3), said shaft extending through the metal hollow cylinder (7); two drivers (4) fixedly mounted on the shaft (5) at the end faces of the metal hollow cylinder (7) and in positive operative engagement with the metal hollow cylinder (7); and an electric heater (6) for local heating of said glass, which is arranged in electrically insulated fashion between the shaft (5) and the metal hollow cylinder (6), with additional thermal insulation of electric heater from the shaft; and
   b) forming said precision in said channel plate with said shaping tool.

* * * * *